United States Patent
Sun et al.

(10) Patent No.: US 8,064,925 B1
(45) Date of Patent: Nov. 22, 2011

(54) METHOD AND SYSTEM FOR DETERMINING VEHICLE TRAFFIC CHARACTERISTICS FROM WIRELESS NETWORK REGISTRATIONS

(75) Inventors: Yaojun Sun, South Riding, VA (US); Zheng Cai, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 548 days.

(21) Appl. No.: 12/247,620

(22) Filed: Oct. 8, 2008

(51) Int. Cl.
*H04W 24/00* (2009.01)
(52) U.S. Cl. .................................. 455/456.1; 455/456.6
(58) Field of Classification Search ......................... None
See application file for complete search history.

(56) References Cited

U.S. PATENT DOCUMENTS

| | | | |
|---|---|---|---|
| 6,236,933 B1 * | 5/2001 | Lang | 701/117 |
| 6,381,533 B1 | 4/2002 | Crane et al. | |
| 6,810,321 B1 * | 10/2004 | Cook | 701/117 |
| 6,842,620 B2 | 1/2005 | Smith et al. | |
| 6,965,325 B2 * | 11/2005 | Finnern | 340/995.23 |

FOREIGN PATENT DOCUMENTS

| | | |
|---|---|---|
| EP | 1 463 354 | 9/2004 |
| WO | WO 01/01367 | 1/2001 |

* cited by examiner

*Primary Examiner* — Kamran Afshar
*Assistant Examiner* — Kenneth Corbin

(57) ABSTRACT

Methods and systems for determining the density and velocity of wireless communication devices (WCDs) on a road are provided. A preferred embodiment involves determining a set of WCDs that are being served by a plurality of wireless coverage areas that intersect the road. This set of WCDs is narrowed to include only those WCDs that are (1) presumed to be in motion and (2) within a predefined geographic definition of the road. The density and aggregate velocity of the resulting WCDs is determined. From these determinations, the traffic density and aggregate traffic velocity of vehicles on the road can be estimated and an associated output can be provided.

18 Claims, 7 Drawing Sheets

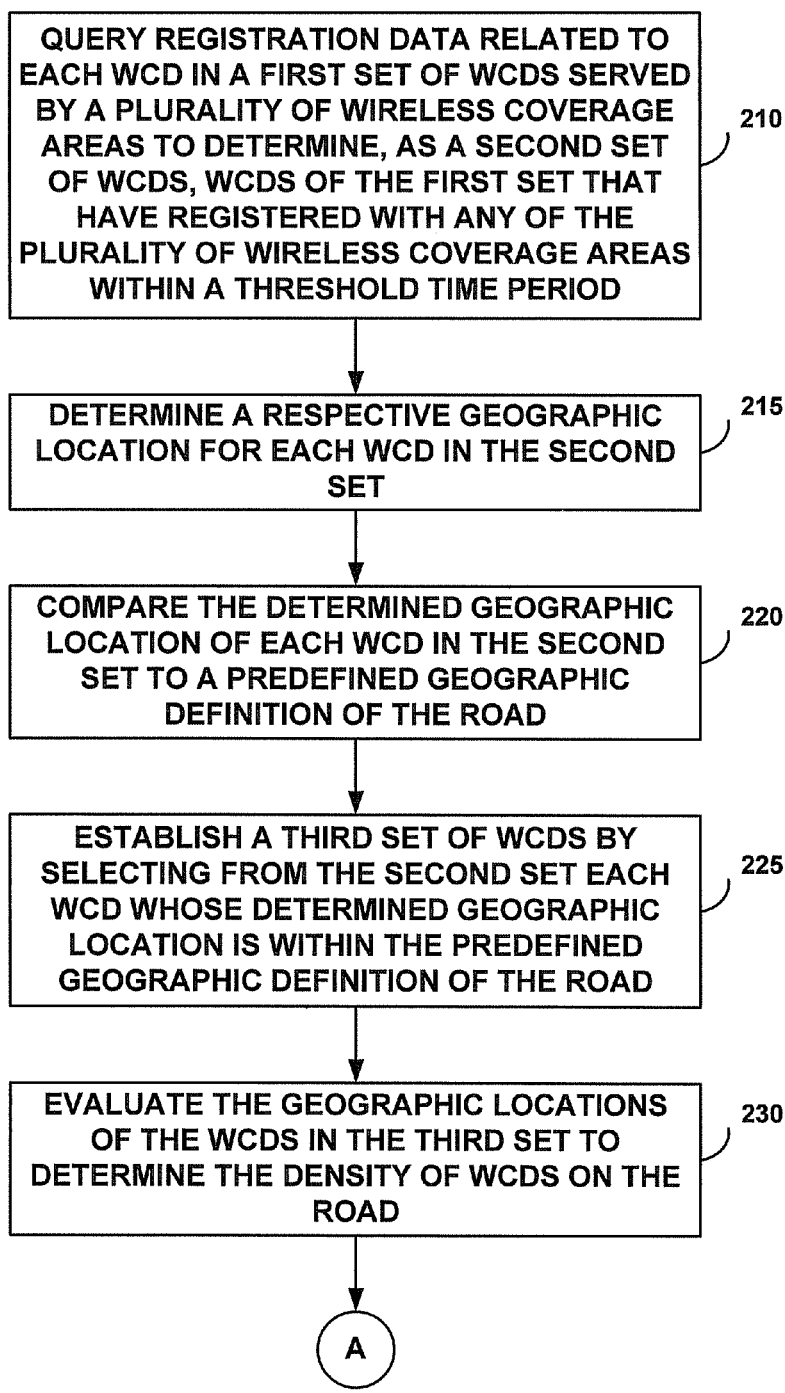

US 8,064,925 B1

METHOD AND SYSTEM FOR DETERMINING VEHICLE TRAFFIC CHARACTERISTICS FROM WIRELESS NETWORK REGISTRATIONS

BACKGROUND

As the global population continues to grow, the population density of cities and suburban areas increases accordingly. This has led to an associated proliferation in vehicular traffic congestion on highways and roads. Drivers and passengers subjected to traffic jams, congestion, and delays often grow frustrated and angry, leading to episodes of "road rage." Furthermore, every additional minute or hour spent in traffic is a minute or hour that these individuals cannot spend with their families or at leisure activities.

Traffic jams are deleterious not only to the individuals experiencing them, but to society as a whole. Time spent in traffic is often idle time in which little or nothing beneficial or productive is accomplished. Additionally, the longer it takes vehicles to get from one place to another, the more these vehicles pollute the environment, while using fuel that depletes already diminished natural resources. Thus, it is in the best interest of all for traffic congestion to be reduced.

In order to decrease traffic congestion, it is important to first be able to accurately measure traffic congestion. However, many attempts to do so, such as traffic helicopters and planes, traffic cameras, or other forms of traffic metering or measurement, tend to be either expensive, inexact, or both.

Proposals have been made to estimate traffic congestion on a road from the number of wireless communication devices (WCDs) within wireless coverage areas that encompass at least a section of the road. The assumption underlying this sort of technique is that WCDs, such as cellular phones, are so prevalent that it is likely that each vehicle on a road contains at least one. However these techniques suffer the problem of differentiating between WCDs that are actually in, on, or otherwise associated with vehicles that are in motion on the road, and WCDs that are not on the road or not in motion. Thus, it is desirable to provide a means for reasonably accurate estimation of vehicular traffic characteristics on a road, using data gathered from WCDs.

Overview

A goal of real-time or near-real-time traffic control systems is to reduce traffic congestion and travel times, while increasing road efficiency. Such a system may dynamically change traffic light timing, traffic routing, and traffic patterns on one or more roads in order to improve overall traffic throughput. It is desirable to acquire accurate real-time or near-real-time traffic information, such as vehicle density and vehicle velocity. Since the penetration of mobile phones, and other types of WCDs, is nearly 100% in some markets, the instantaneous location and velocity of the WCDs on a road can serve as the basis for estimating the density and velocity of vehicles on that road. This information can be used to improve the performance of traffic control systems.

Accordingly, methods and systems are presented for determining a density and a representative velocity for WCDs on a road. From these values, the associated density and velocity of vehicles on the road can be estimated.

In a first embodiment, a road intersects a number of wireless coverage areas, the wireless coverage areas serving a first set of WCDs. Registration data related to each WCD in the first set is queried to determine, as a second set of WCDs, WCDs of the first set that have registered with any of the wireless coverage areas within a threshold time period. After determining a geographic location for each WCD in the second set, these geographic locations are compared to a predefined geographic definition of the road to determine a third set of WCDs that are on the road.

Thus, the third set of WCDs is likely to contain WCDs that are in motion, due to their registering within a threshold time period, and that are on the road. Therefore, the characteristics of these WCDs can be used to estimate the vehicular traffic characteristics of the road. For instance, these WCDs can be counted to determine a WCD density. Furthermore, along with determining the geographic locations of these WCDs, the velocity of each WCD can also be determined, and an aggregate velocity of the third set of WCDs can be calculated. The density and aggregate velocity of these WCDs preferably serve as the basis of estimates of the traffic density and aggregate traffic velocity of vehicles on the road. Various types of output, based on the determined characteristics of these WCDs, may be provided.

In a second embodiment, a road intersects a first wireless coverage area operating according to a first wireless technology and also intersects a second wireless coverage area operating according to a second wireless technology. Each wireless coverage area may serve a set of WCDs. Registration data related to each WCD in these sets is queried to determine WCDs that have registered with either of the wireless coverage areas within a threshold time period. After determining a geographic location for each of such WCDs, these geographic locations are compared to a predefined geographic definition of the road to determine the WCDs that are on the road. Similar to the first embodiment, the locations of WCDs determined to be in motion and on the road according to this embodiment can be used to estimate the traffic density of vehicles on the road, and output based on the determined characteristics of the WCDs may be provided. Furthermore, the velocities of these WCDs can be used to estimate the velocities of vehicles on the road.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIGS. 2A and 2B depict a method in accordance with a preferred embodiment;

DESCRIPTION

In accordance with exemplary embodiments, methods and devices for determining vehicle traffic characteristics from wireless network registrations are presented. Preferably, the geographic location and velocity of WCDs that have recently registered with a wireless network and are on a road are used to estimate the density and velocity of vehicles on the road.

I. SYSTEM ARCHITECTURE

Figure 1:
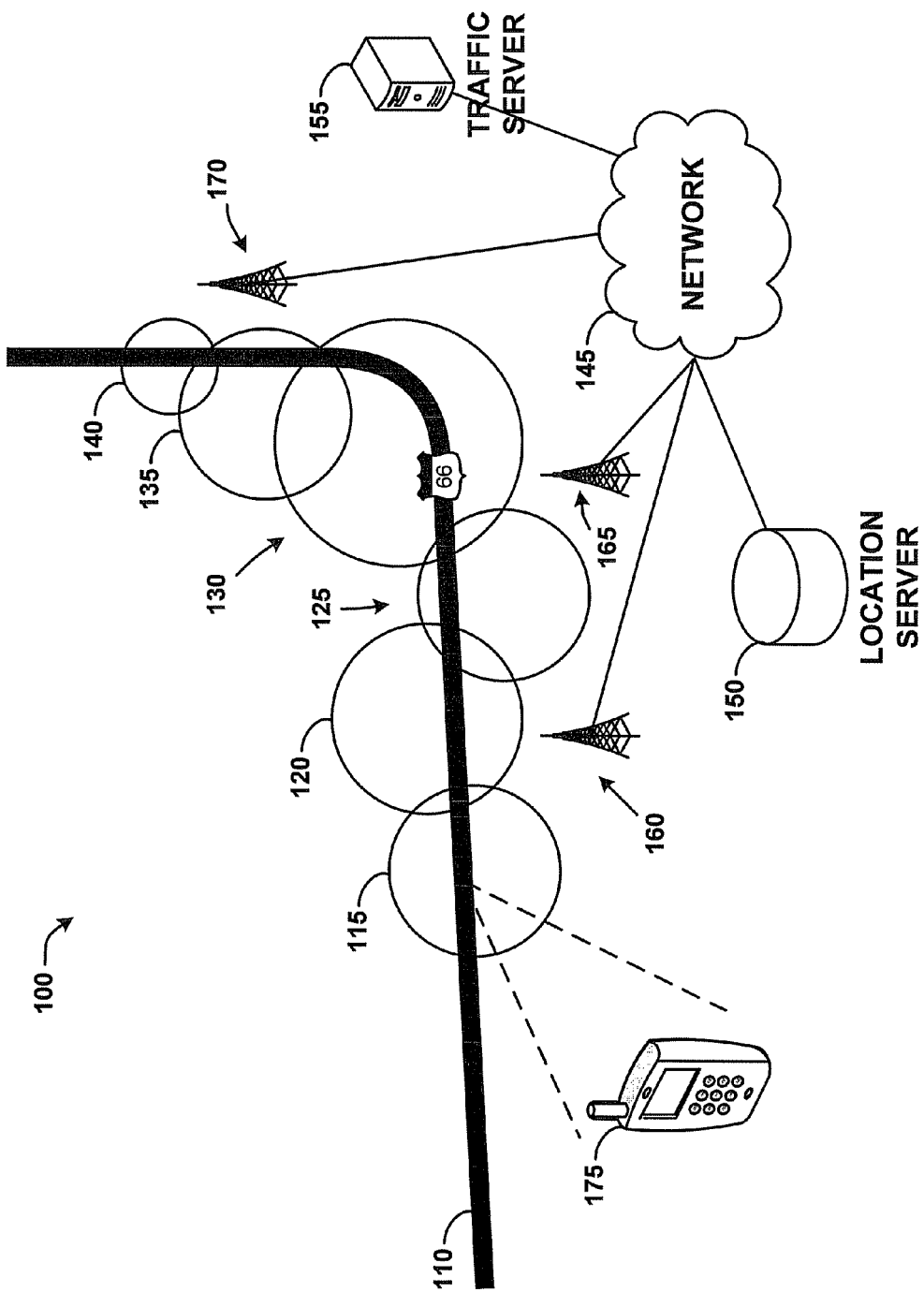
FIG. 1 depicts a road intersecting a plurality of wireless coverage areas in accordance with a preferred embodiment.

FIG. 1 depicts system 100 for determining vehicle traffic characteristics. In system 100, road 110 intersects wireless coverage areas 115, 120, 125, 130, 135, 140. Thus, WCDs in vehicles on road 110, such as WCD 175, can be served by one or more of these wireless coverage areas while the vehicles with which they are associated are on road 110. For example, a driver of a car traveling road 110 may be carrying a cell phone that registers with wireless coverage area 115, then registers with wireless coverage area 120, and so on.

Base transceiver stations (BTSs) 160, 165, 170 radiate to define wireless coverage areas 115, 120, 125, 130, 135, 140, and possibly other wireless coverage areas not shown in FIG. 1. Preferably these BTSs are communicatively coupled to one or more base station controllers (not shown), that, among other things, manage the wireless resources associated with each BTS, and route traffic to and from each BTS. Regardless, BTSs 160, 165, 170 may be communicatively coupled to network 145, through which these BTSs may be able to communicate with location server 150 and traffic server 155.

It should be appreciated that the elements in FIG. 1 are exemplary, and in preferred embodiments of this invention more or fewer elements may be included in a system such as system 100, and the elements may be arranged differently or omitted altogether. For example, network 145 may comprise one or more links to the Internet or private Internet Protocol (IP) networks.

Furthermore, these elements may comprise multiple physical or logical devices or components, or may be combined into fewer physical or logical components than is shown in FIG. 1. Additionally, elements such as BTSs 160, 165, 170, location server 150, traffic server 155, and WCD 175 preferably include a processor, a memory, and a network interface. The memory of such a device may include data that can be manipulated by the processor and program logic executable by the processor to perform functions according to the preferred embodiments herein, including the sending and receiving of data via the network interface.

Moreover, the devices in system 100 may operate in accordance to various types of wireless protocols, such as Code Division Multiple Access (CDMA), Worldwide Interoperability for Microwave Access (WIMAX), Universal Mobile Telecommunications System (UMTS), 802.11 (Wifi), or other protocols now known or later developed.

The characteristics and functions of each of these elements are described at a high level in the following subsections. However, the descriptions in these subsections are merely introductory and should not be interpreted to limit the characteristics and functions of these elements.

a. BTSs

As described above, BTSs 160, 165, 170 radiate to define wireless coverage areas. Each wireless coverage area may provide air interface access to WCD 175 and any other WCDs served by the wireless coverage area. A single BTS may define one or more wireless coverage areas. The air interface of these wireless coverage areas may include forward links for transmitting information from a BTS to a WCD (in the forward direction) and reverse links for transmitting information from a WCD to a BTS (in the reverse direction). Through the forward and reverse links, a BTS and a WCD may exchange signaling traffic, as well as bearer traffic, such as voice, data, video, or other media. Although FIG. 1 shows only BTSs 160, 165, and 170, system 100 may include more or fewer BTSs.

b. WCDs

A WCD in system 100, such as WCD 175, could be a wireless telephone, a wireless personal digital assistant, a wirelessly equipped laptop computer, a wireless router, or another type of mobile or fixed wireless device. Preferably, a WCD is a subscriber device, which is manipulated by a human in order to establish circuit-switched or packet-switched voice and/or data calls. However a WCD could also be an automated device without a human interface.

Typically, a WCD is associated with one or more BTSs at a time and uses the wireless coverage areas of these BTSs to communicate with correspondent nodes, such as web servers, gaming servers, short message service (SMS) servers, voice over IP (VoIP) signaling proxies, VoIP bearer gateways, and other WCDs. A WCD may also be able to transfer ongoing communication sessions from one BTS to another in a handoff process.

When a WCD enters a first wireless coverage area, some combination of the first wireless coverage area's serving BTS, base station controller, and the WCD itself, may determine that the first wireless coverage area should offer service to the WCD. If so, the WCD may register with the first wireless coverage area. Typically, this involves the WCD attaching to the first wireless coverage area, and being assigned forward direction and reverse direction channels for signaling and/or bearer traffic. Once registered, a home location register (HLR), visitor location register (VLR), or both maintain a record of the WCD's registration status, including an indication that the WCD is registered with the first wireless coverage area.

As the WCD continues to move, it may leave the first wireless coverage area and enter a second wireless coverage area. In this case, the WCD may be handed off the first wireless coverage area to the second wireless coverage area. The WCD may then register with the second wireless coverage area, and the WCD's record in the HLR and/or VLR is updated accordingly.

A WCD, such as WCD 175, preferably contains location determining logic such as a global positioning satellite (GPS) transceiver, with which to determine its geographic location. However, a WCD may contain another type of location determining logic, such as logic to estimate the WCD's geographic location by triangulating signals received from two or more BTSs.

Furthermore, a WCD preferably also contains velocity determining logic. This velocity determining logic may be part of any GPS components associated with the WCD. Alternatively, the velocity determining logic may rely upon two or more measurements of the WCD's location determining logic taken a period of time apart, and from these measurements calculate a velocity of the WCD. Other means for a WCD to determine its velocity are also possible.

A WCD, such as WCD 175, may also be capable of reporting its determined geographic location and/or velocity to an element of system 100, such as location server 150. Alternatively or additionally, a WCD may respond to queries from elements of system 100, such as location server 150 and/or traffic server 155, with the WCD's determined geographic location and/or velocity.

c. Location Server

Location server 150 is preferably an element of system 100 and may be located near or co-located with one or more BTSs. However, location server 150 may be located in or coupled to any part of network 145, or may be remotely located. Location server 150 may be a standalone device or, instead of being implemented in a separate element, location server 150 may be contained within one or more HLRs or VLRs of a wireless communication network.

Location server 150 may receive and store WCD location information. For example, location server 150 may comprise a database that includes a WCD's identifying information (e.g., an International Mobile Subscriber Identifier (IMSI), an Electronic Serial Number (ESN), or some other means to uniquely distinguish each WCD). Along with this identifying information, the database may include the last known geographic location and/or last known velocity of the WCD. The database may additionally include one or more previous geographic locations and/or previous velocities of the WCD. Geographic locations stored by location server 150 may be based on GPS-determined coordinates, triangulated coordinates, or another means for determining the locations or coordinates of devices such as WCDs. Preferably, location server 150 responds to queries from other network elements, such as traffic server 155, with appropriate information from its database.

With respect to receiving location updates from WCDs, location server 150 may operate based on either a push model, a pull model or a combination of both models. Using a push model, WCDs periodically, or from time to time, transmit their geographic location and/or velocity information to location server 150. Alternatively, under the pull model, location server 150 may periodically, or from time to time, poll one or more WCDs to determine their geographic location and/or velocity information. Regardless of whether this information is received via push or pull mechanisms, upon receiving this information, location server 150 preferably updates its database accordingly.

Location server 150 is not required to receive geographic location and/or velocity information directed from WCDs. Instead, location server 150 may receive location information related to WCDs from other network elements, such as BTSs, base station controllers, or other location servers.

d. Traffic Server

Traffic server 155 may be one or more personal computers, servers, blade servers, network appliances, or databases, each preferably comprising a processor, memory, a network interface, and input/output functions. Traffic server 155 may take the form of a single physical device, or may be divided into multiple logical components spanning a number of physical devices.

Traffic server 155 may also operate based on either a push model or a pull model. Thus, traffic server 155 may periodically, or from time to time, query one or more location servers, such as location server 150, and/or one or more of BTSs 160, 165, 170, or other devices for information relating to WCDs. Alternatively or additionally, one or more location servers, such as location server 150, and/or one or more of BTSs 160, 165, 170, or other devices may transmit information relating to WCDs to traffic server 155. Traffic server 155 may collect such information from WCDs in multiple wireless coverage areas, including the wireless coverage areas utilizing more than one wireless technology.

Once provisioned with information relating to WCDs, traffic server 155 may use this information to perform traffic control functions. For example, based on the density and/or velocity of WCDs on a particular segment of a road, traffic server 155 may change the traffic light timing on that road in order to move vehicles more quickly through that segment of the road, thus reducing congestion. Also, traffic server 155 may also adjust the flow of traffic off of a congested road and on to a less congested road, so as to increase traffic throughput. Alternatively or additionally, traffic server 155 could report or otherwise output traffic conditions for viewing by users of traffic server 155 or other parties. Of course, any actions that traffic server 155 may take based on this information relating to WCDs is not limited to these steps, and traffic server 155 may include other means for modifying or presenting traffic patterns as well. Furthermore, traffic server 155 may be only one part of a larger and more involved traffic control system comprising additional elements.

e. Network

Network 145 is preferably a packet-switched network, such as an IP network, communicatively linking location server 150, traffic server 155, BTSs 160, 165, 170, and a variety of other devices, to one another. In order to do so, network 145 may contain various types of routers, switches, gateways, firewalls, and servers. Network 145 may also include one or more connections to the public Internet and/or private IP networks, or may itself be distributed across multiple physical or topological locations on the public Internet and/or private IP networks. Accordingly, the various elements within or connected to network 145, such as location server 150, traffic server 155, and BTSs 160, 165, 170 may be owned, managed, or operated by different organizations or organizational entities.

II. EXEMPLARY OPERATION

The following flow charts depict methods in accordance with preferred embodiments by representing respective sequences of steps or events. However, these steps or events may occur in a different order, and fewer or more steps or events may occur without departing from the scope of the embodiments. Moreover, the methods depicted in these flow charts may be combined with one another wholly or in part, to form additional embodiments that are also within the scope of this invention.

FIG. 2A depicts a flow chart of method 200. Method 200 provides a means to determine a set of WCDs that are likely to be moving and are within a geographic definition of a road. Then, this information may be used to determine a density and an aggregate velocity of these WCDs, from which a density and an aggregate velocity of vehicles on the road can be estimated.

At step 210, registration data related to WCDs served by a plurality of wireless coverage areas is queried. These WCDs may be referred to as a first set of WCDs. The wireless coverage areas are preferably intersected by a segment of a road, as depicted in FIG. 1. From this first set, a second set of WCDs is determined. The WCDs placed in the second set includes any WCD in the first set that has registered with any of the plurality of wireless coverage areas within a threshold time period.

Preferably, the threshold time period is defined to be an amount of time such that any WCD that has registered within the threshold time period is likely to be moving. For example, if the threshold time period is one minute, then any WCD from the first set that has registered with any of the plurality of wireless coverage areas in the last one minute will be placed in the second set. A goal of this step is to determine WCDs that have recently registered, as these WCDs are likely to be moving, and therefore are more likely to be associated with a vehicle.

An additional advantage of gathering location information only from WCDs that have recently registered is that it is likely that not all WCDs in the plurality of wireless coverage areas have recently registered. Thus, location information will likely be gathered from a subset of all WCDs, and therefore less location information will need to be gathered. If the location information is gathered by polling each WCD for its location, wireless network capacity may be deleteriously affected.

Wireless coverage areas may differ in size based on their intended scope of coverage, the density of WCDs in the area, their wireless frequency, and other factors. Thus, ideally, the threshold time period is configurable. For instance, in regions with large wireless coverage areas the threshold time period might be set to five minutes, while in regions with smaller coverage areas, the threshold time period might be set to one minute or less. Furthermore, each individual wireless coverage area may define its own configurable threshold time period.

At step 215, a respective geographic location for each WCD in the second set is determined. As discussed above, this geographic location may be GPS coordinates, or a location determined via triangulation. Furthermore, the geographic location may be determined by each WCD, a radio access network element such as a BTS, or through some combination of these devices. Additionally, the geographic location may be delivered via a push or pull model.

Once the geographic location of each WCD in the second set is determined, at step 220, these locations are compared to a predetermined geographic definition of the road. This predetermined geographic definition may be based on one or more types of position determining systems, such as GPS, coordinates from a different satellite-based system, longitude and latitude, Long Range Aid to Navigation (LORAN) systems, and so on. Preferably the predetermined geographic definition of the road is of such an accuracy that WCDs on the road can be differentiated from WCDs not on the road.

The respective geographic locations of each WCD in the second set and the predetermined geographic definition of the road are used, at step 225, to establish a third set of WCDs. The WCDs in the third set are WCDs from the second set with a geographic location that has been determined to be within the predetermined geographic definition of the road. Thus, the third set contains WCDs that (1) are registered with at least one of the plurality of wireless coverage areas intersected by the road, (2) have recently been in motion, and (3) are on the road. Thus, it is likely that WCDs in the third set are either within, on, attached to, or otherwise associated with vehicles on the road.

A goal of this method is to exclude most non-moving or very slow moving WCDs from the third set. Such WCDs are excluded because, for example, they may be either stationary, or associated with pedestrians walking along or near the road. A further goal of this method is to exclude WCDs that may be moving, but are not on the road, from the third set. In practice, it may not be possible to meet both of these goals all of the time, but so long as a substantial proportion of WCDs in the third set are both moving and on the road, this method will serve its intended purpose.

Figure 2B:
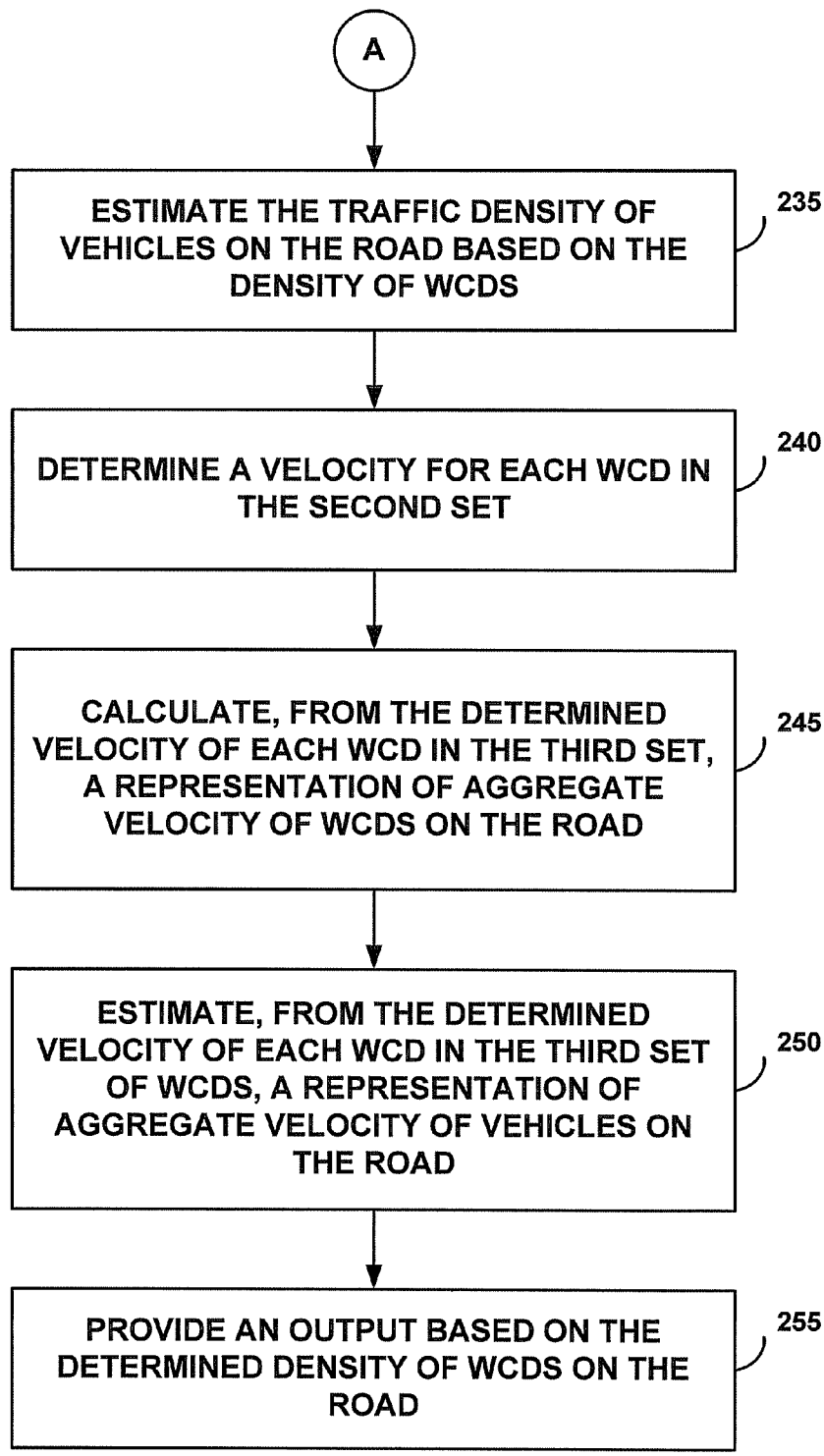
Figure 2C:
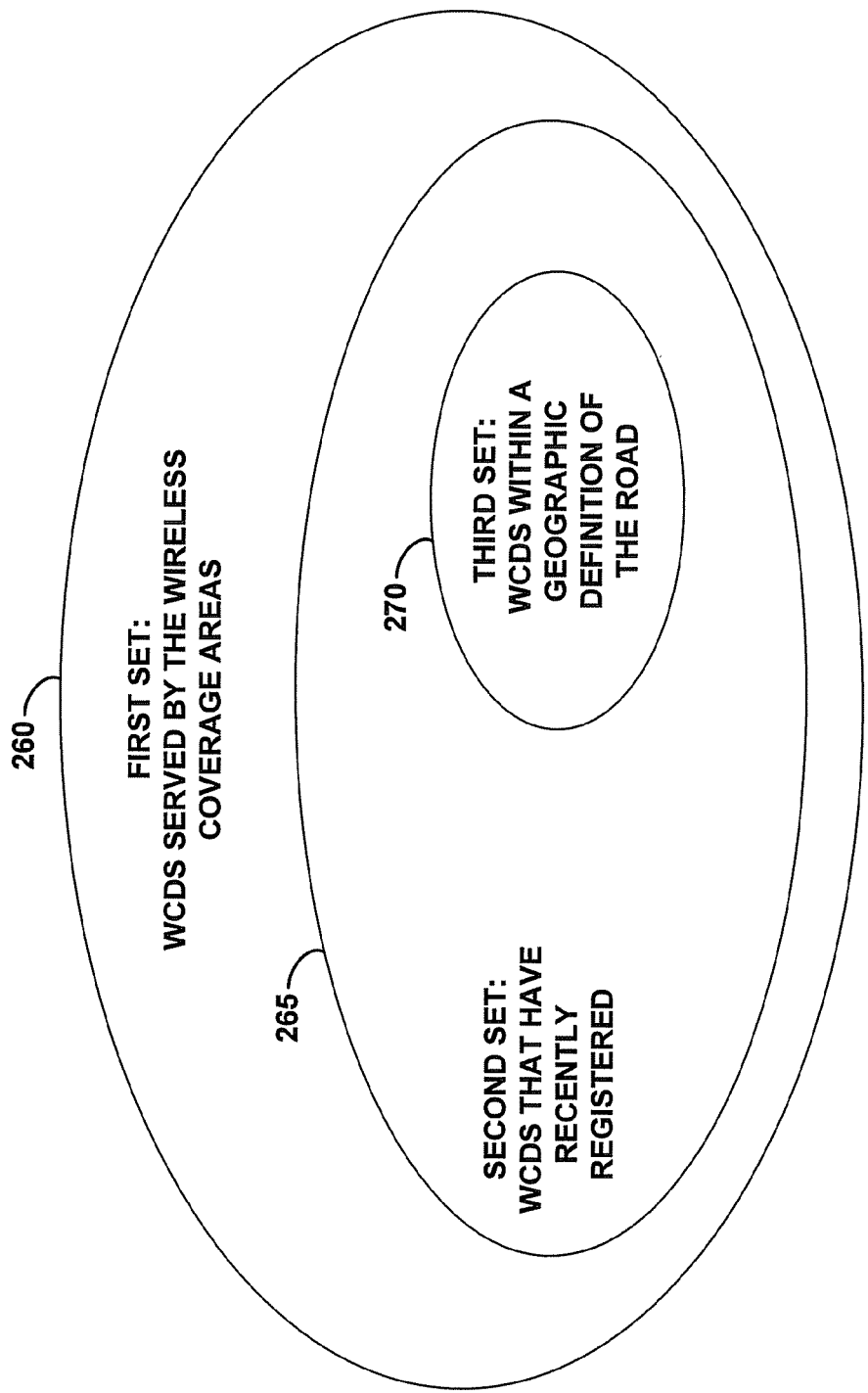
FIG. 2C depicts various groupings of WCDs in accordance with a preferred embodiment.

Turning momentarily to FIG. 2C, a representation of the relationship between the first set 260, the second set 265, and the third set 270 of WCDs is shown. Here, the second set 265 is a subset of the first set 260, and the third set 270 is a subset of the second set 265. However, the second set 265 need not be a proper subset of the first set 260, and the third set 270 need not be a proper subset of the second set 265. For example, second set 265 may contain all of the WCDs in first set 260, and third set 270 may contain all of the WCDs of second set 265.

Turning back to FIG. 2A, at step 230, the geographic locations of WCDs in the third set are evaluated to determine the density of WCDs on the road. This can be accomplished by counting the number of WCDs in the third set. Alternatively, multiple segments of the road may be defined and the WCDs in the third set may be divided into subsets based on which segment of the road they are on. Thus, the density of WCDs on each segment of the road can be determined.

FIG. 2B continues method 200. At step 235, the traffic density of vehicles on the road is estimated based on the density of WCDs calculated at step 230. This estimation may be based on the assumption that each WCD on the road is uniquely associated with a vehicle, or may be based on other calculations. For example, through surveys or empirical data, it may be determined that the average number of WCDs per vehicle is 0.7 or 1.1. Then, the number of vehicles on the road may be estimated as the number of WCDs in the third set divided by the average number of WCDs per vehicle.

At step 240, a velocity is determined for each WCD in the second set. Such a determination may be based on velocity determining logic in each WCD, as described above, or based on other factors. These velocity determinations may occur after step 235, as is shown in FIG. 2B, or at a different point in time, as such before or after step 215. At step 245, a representation of aggregate velocity of WCDs on the road is determined from the velocity of each WCD in the third set. This representation of aggregate velocity may be based on various statistical calculations, such as mean, median, standard deviation, inter-quartile range, and so on.

At step 250, similar techniques may be used to estimate the velocity of vehicles on the road. For example, a representation of aggregate velocity of vehicles on the road may be determined from the velocity of each WCD in the third set also by using calculations such as mean, median, standard deviation, or inter-quartile range. Alternatively, the statistical value or values determined in step 245 may be used as estimates of aggregate vehicle velocity on the road.

At step 255, an output, based on the determined density of WCDs on the road, is provided. The intermediate results from any of steps 230, 235, 240, 245, or 250 may be specified in this output. Thus for example, the output may include the estimated density and estimated velocity of WCDs on the road. The output may take many forms, including but not limited to information written to a database or provided on a world-wide web site. Furthermore, this output may be transmitted to a traffic control system. Such a traffic control system may adjust traffic patterns on the road and/or other roads in the vicinity based on the output. Additionally or alternatively, the output may be provided to the users of the WCDs on the road so that these users can make more informed driving decisions.

The steps and processes described in method 200 may also be applied across multiple types of wireless technologies. A wireless service provider may employ more than one wireless technology to provide wireless coverage to the same or a substantially similar geographic area. For example, a wireless service provider may have overlapping CDMA and WIMAX deployments within a city. Of course any other type of wireless technologies may be deployed in an overlapped fashion, such as CDMA and UMTS, or UMTS and Wifi. Additionally, two different wireless service providers, each supporting a different wireless technology, may work together to provide estimates of vehicle traffic characteristics using techniques described herein.

Figure 3A:
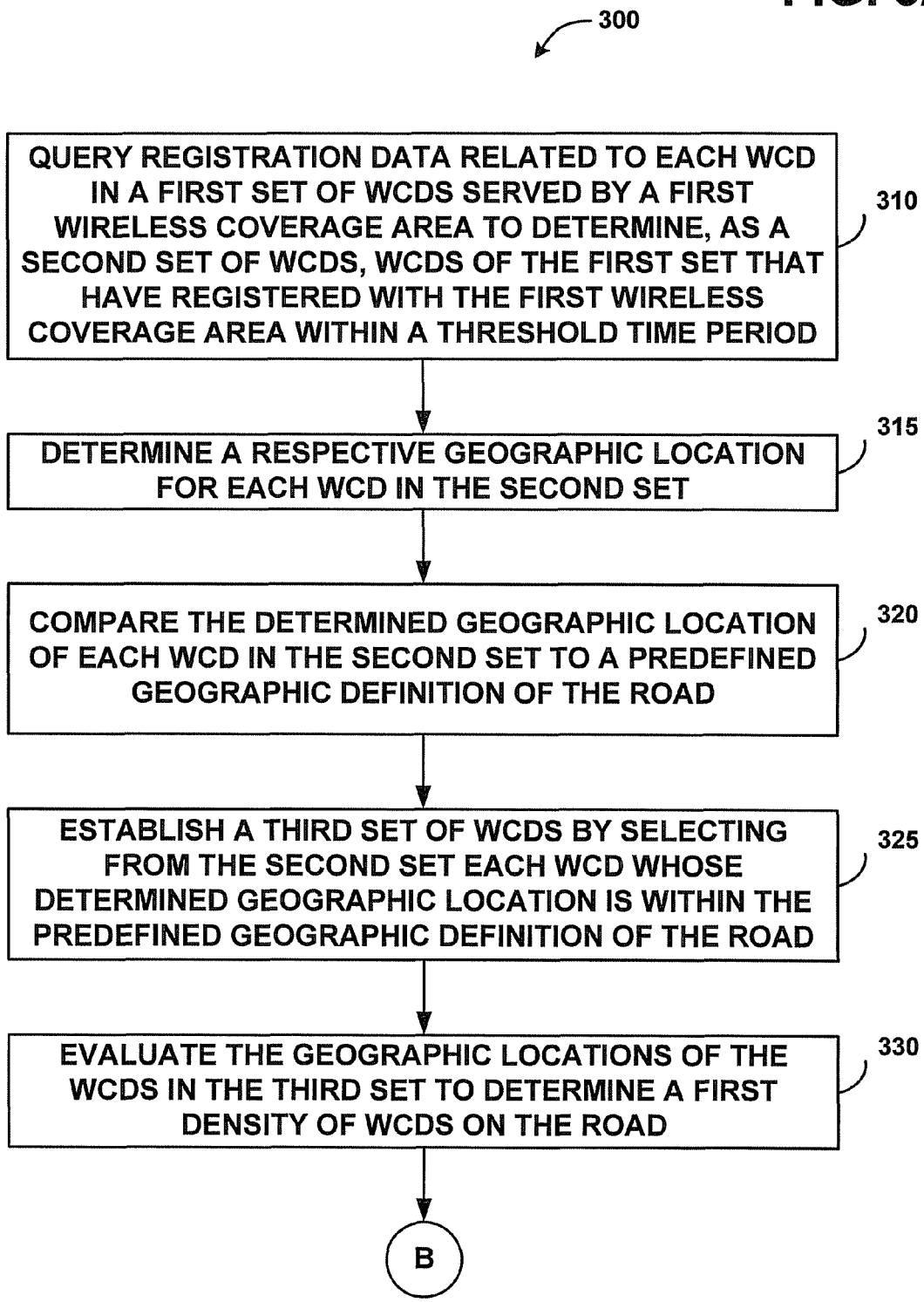
FIGS. 3A and 3B depict a method in accordance with a preferred embodiment.
Figure 3B:
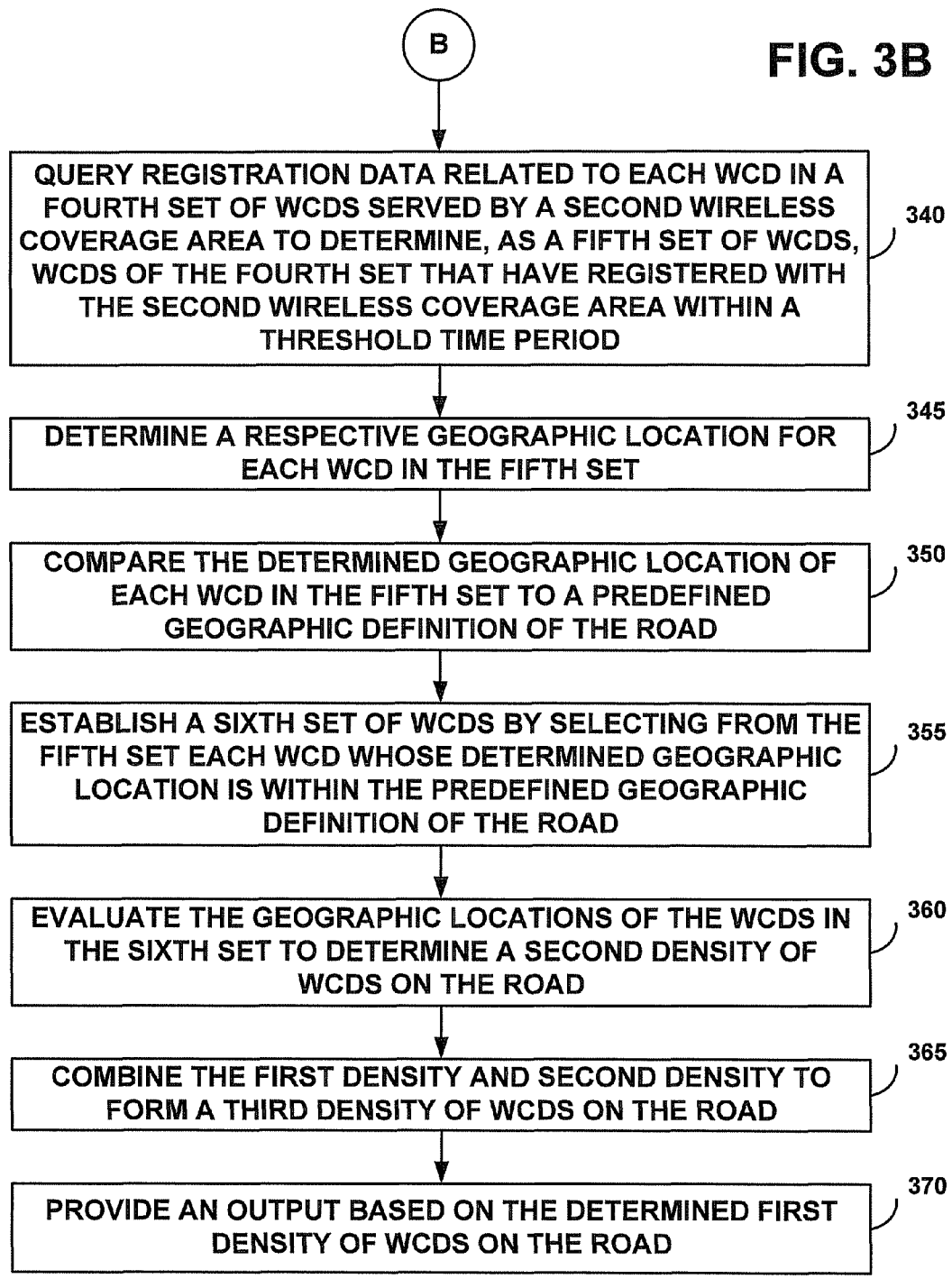

Regardless of the types of wireless technology used, if some WCDs on a road are using one wireless technology while other WCDs on the road are using another wireless technology, all of these WCDs may be counted in order to determine a reasonably accurate density and/or velocity of WCDs on the road. FIG. 3 depicts method 300 for doing so.

Method 300 begins in a similar fashion as method 200. At step 310, registration data related to WCDs served by a first wireless coverage area operating according to a first wireless technology is queried. These WCDs may be referred to as a first set of WCDs. The first wireless coverage area is preferably intersected by a segment of a road, as depicted in FIG. 1. From this first set, a second set of WCDs is determined. The WCDs placed in the second set includes any WCD in the first set that has registered with the first wireless coverage area within a threshold time period.

At step 315, a respective geographic location, such as GPS coordinates, for each WCD in the second set is determined. Once the geographic location of each WCD in the second set is determined, at step 320, these locations are compared to a predetermined geographic definition of the road. The respective geographic locations of each WCD in the second set and the predetermined geographic definition of the road are used, at step 325, to establish a third set of WCDs. The WCDs in the third set are WCDs from the second set with a geographic location that has been determined to be within the predetermined geographic definition of the road.

At step 330, the geographic locations of WCDs in the third set are evaluated to determine a first density of WCDs on the road. This can be accomplished, for example, by counting the number of WCDs in the third set.

At step 340, registration data related to WCDs served by a second wireless coverage area operating according to a second wireless technology is queried. These WCDs may be referred to as a fourth set of WCDs. The second wireless coverage area is also preferably intersected by the segment of the road. From this fourth set, a fifth set of WCDs is determined. The WCDs placed in the fifth set includes any WCD in the fourth set that has registered with the second wireless coverage area within a threshold time period.

At step 345, a respective geographic location, such as GPS coordinates, for each WCD in the fifth set is determined. Then, at step 350, these locations are compared to a predetermined geographic definition of the road. The respective geographic locations of each WCD in the fifth set and the predetermined geographic definition of the road are used, at step 355, to establish a sixth set of WCDs. The WCDs in the sixth set are WCDs from the fifth set with a geographic location that has been determined to be within the predetermined geographic definition of the road.

At step 360, the geographic locations of WCDs in the sixth set are evaluated to determine a second density of WCDs on the road. This can be accomplished, for example, by counting the number of WCDs in the sixth set. At step 365, the first density of WCDs is combined with the second density of WCDs to form a third density of WCDs on the road. This third density of WCDs is representative of WCDs from both wireless coverage areas.

Of course, from the third density of WCDs, an estimate of vehicle density on the road can be made. Furthermore, using techniques similar to those described above in reference to method 200, velocity of WCDs in both the first and the second wireless coverage areas can be used to determine an aggregate velocity of WCDs on the road as well as an estimated aggregate velocity of vehicles on the road.

At step 370, an output, based on the first density of WCDs on the road, is provided. The intermediate results from any of steps 330, 360, or 365 may be specified in this output. Thus for example, the output may specify the densities of the third set of WCDs and the sixth set of WCDs. Furthermore, the output may specify the estimated density and estimated velocity of vehicles on the road. Similar to the output of step 255, this output may take many forms, including but not limited to information written to a database or provided on a world-wide web site. Furthermore, the output may be transmitted to a traffic control system. Such a traffic control system may adjust traffic patterns on the road and/or other roads in the vicinity based on the output. Additionally or alternatively, the output may be provided to the users of the WCDs on the road so that these users can make more informed driving decisions.

III. TRAFFIC SERVER EMBODIMENT

Figure 4:
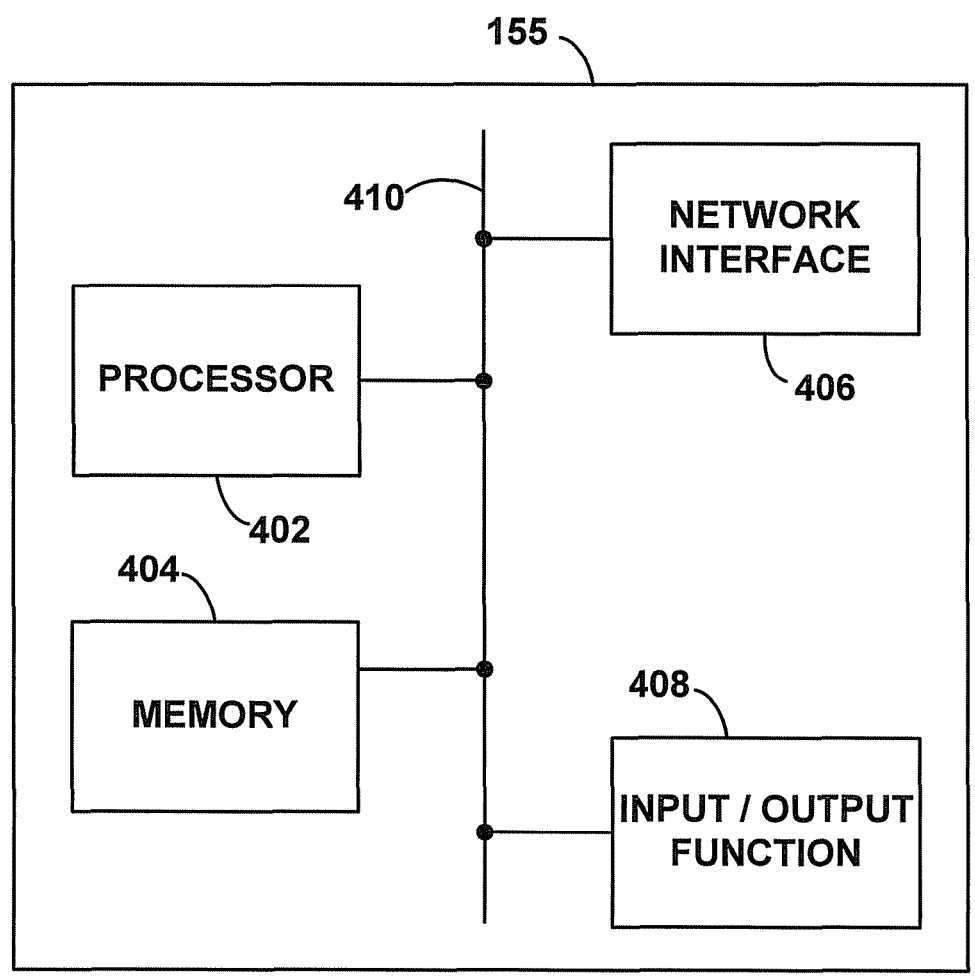
FIG. 4 is a functional diagram of a traffic server in accordance with a preferred embodiment.

FIG. 4 is a simplified block diagram exemplifying a traffic server 155, and illustrating some of the functional components that would likely be found in a traffic server arranged to operate in accordance with the embodiments herein. Example traffic server 155 could be a server device in network 145, or any other device that collects, manages, or provides characteristics of WCDs and/or estimates of vehicle traffic characteristics on a given segment of a road. However, example traffic server 155 can take other forms and comprise other information as well.

Example traffic server 155 preferably includes a processor 402, a memory 404, a network interface 406, and an input/output function 408, all of which may be coupled by a system bus 410 or a similar mechanism. Processor 402 preferably includes one or more CPUs, such as one or more general purpose processors and/or one or more dedicated processors (e.g., application specific integrated circuits (ASICs) or digital signal processors (DSPs), etc.) Memory 404, in turn, may comprise volatile and/or non-volatile memory and can be integrated in whole or in part with processor 402.

Memory 404 preferably holds program instructions executable by processor 402, and data that is manipulated by these instructions to carry out various logic functions described herein. (Alternatively, the logic functions can be defined by hardware, firmware, and/or any combination of hardware, firmware and software.)

Network interface 406 may take the form of a wireline connection, such as an Ethernet, Token Ring, or T-carrier connection. Network interface 406 may also take the form of a wireless connection, such as IEEE 802.11 (Wifi), BLUETOOTH®, or a wide-area wireless connection. However, other forms of physical layer connections and other types of standard or proprietary communication protocols may be used over network interface 406. Furthermore, network interface 406 may comprise multiple physical interfaces.

Input/output function 408 facilitates user interaction with example traffic server 155. Input/output function 408 may comprise multiple types of input devices, such as a keyboard, a mouse, a touch screen, and so on. Similarly, input/output function 408 may comprise multiple types of output devices, such as a monitor, printer, or one or more light emitting diodes (LEDs). Additionally or alternatively, example traffic server 155 may support remote access from another device, via network interface 406 or via another interface (not shown), such an RS-232 port.

By way of example, memory 404 may comprise program logic executable by processor 402 to receive a request to determine traffic characteristics of the road, and to query registration data related to each WCD in the first set, wherein the querying determines, as a second set of WCDs, WCDs of the first set that have registered with any of the plurality of wireless coverage areas within a threshold time period.

Furthermore, memory 404 may comprise program logic executable by processor 402 to determine a respective geographic location for each WCD in the second set, compare the determined geographic location of each WCD in the second set to a predefined geographic definition of the road, and establish a third set of WCDs by selecting from the second set each WCD whose determined geographic location is within the predefined geographic definition of the road.

Additionally, memory 404 may comprise program logic executable by processor 402 to evaluate the geographic locations of the WCDs in the third set to determine a density of WCDs on the road, from which processor 402 may calculate the traffic density of vehicles on the road. This program logic may also provide an output based on the determined density of WCDs on the road or based on the calculated traffic density of vehicles on the road.

Beyond these calculations of density, memory 404 may also comprise program logic executable by processor 402 to determine a velocity for each WCD in the second set, calculate, from the determined velocity of each WCD in the third set, a representation of aggregate velocity of WCDs on the road, and calculate, also from the determined velocity of each WCD in the third set, a representation of aggregate velocity of vehicles on the road. The output provided by traffic server 155 may also include representations of the aggregate velocity of WCDs on the road and/or representations of the aggregate velocity of vehicles on the road.

Memory 404 may also contain stored data representing one or more location servers, base station controllers, or BTSs with which traffic server 155 may communicate, as well as the results of one or more of the calculations of WCD density, WCD velocity, vehicle density, or vehicle velocity as described above.

IV. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A method for determining a density of wireless communication devices (WCDs) on a road, wherein the road intersects a plurality of wireless coverage areas, and wherein the plurality of wireless coverage areas serve a first set of WCDs, the method comprising:
    querying registration data related to each WCD in the first set to determine, as a second set of WCDs, WCDs of the first set that have registered with any of the plurality of wireless coverage areas within a threshold time period;
    determining a respective geographic location for each WCD in the second set;
    comparing the determined geographic location of each WCD in the second set to a predefined geographic definition of the road;
    establishing a third set of WCDs by selecting from the second set each WCD whose determined geographic location is within the predefined geographic definition of the road;
    evaluating the geographic locations of the WCDs in the third set to determine the density of WCDs within the predefined geographic definition of the road, wherein evaluating the geographic locations of the WCDs in the third set to determine the density of WCDs within the predefined geographic definition of the road comprises dividing a number of WCDs in the third set by a predetermined average number of WCDs per vehicle; and
    providing an output based on the determined density of WCDs on the road.

2. The method of claim 1, further comprising:
    estimating the traffic density of vehicles on the road based on the determined density of WCDs, wherein the output specifies the traffic density of vehicles on the road.

3. The method of claim 1, wherein determining the respective geographic location for each WCD in the second set comprises polling the respective geographic location of each WCD in the second set.

4. The method of claim 1, wherein the threshold time period is a configurable parameter.

5. The method of claim 1, wherein determining the respective geographic location for each WCD in the second set comprises determining global positioning system (GPS) coordinates of at least some WCDs in the second set.

6. The method of claim 5, wherein GPS coordinates are determined by polling WCDs.

7. The method of claim 1, wherein the predefined geographic definition of the road is a set of GPS coordinates that represent boundaries of the road.

8. The method of claim 1 further comprising:
    determining a velocity for each WCD in the second set;
    calculating, from the determined velocity of each WCD in the third set, a representation of aggregate velocity of WCDs on the road, wherein the output is further based on the representation of aggregate velocity of WCDs on the road.

9. The method of claim 8, further comprising:
    estimating, from the determined velocity of each WCD in the third set of WCDs, a representation of aggregate velocity of vehicles on the road, and
    wherein the output specifies the representation of aggregate velocity of vehicles on the road.

10. A method for determining a density of wireless communication devices (WCDs) on a road, wherein the road intersects a first wireless coverage area operating according to a first wireless technology, wherein the first wireless coverage area serves a first set of WCDs that operate according to the first wireless technology, wherein the road also intersects a second wireless coverage area operating according to a second wireless technology, wherein the second wireless coverage area serves a fourth set of WCDs that operate according to the second wireless technology, the method comprising:
    querying registration data related to each WCD in the first set to determine, as a second set of WCDs, WCDs of the first set that have registered with the first wireless coverage area within a threshold time period;
    determining a respective geographic location for each WCD in the second set;
    comparing the determined geographic location of each WCD in the second set to a predefined geographic definition of the road;
    establishing a third set of WCDs by selecting from the second set each WCD whose determined geographic location is within the predefined geographic definition of the road;
    evaluating the geographic locations of the WCDs in the third set to determine a first density of WCDs on the road;
    querying registration data related to each WCD in the fourth set to determine, as a fifth set of WCDs, WCDs of the fourth set that have registered with the second wireless coverage area within a threshold time period;
    determining a respective geographic location for each WCD in the fifth set;
    comparing the determined geographic location of each WCD in the fifth set to the predefined geographic definition of the road;

establishing a sixth set of WCDs by selecting from the fifth set each WCD whose determined geographic location is within the predefined geographic definition of the road;

evaluating the geographic locations of the WCDs in the sixth set to determine a second density of WCDs on the road;

combining the first density and the second density to form a third density of WCDs on the road; and providing an output based on the third density of WCDs on the road.

11. The method of claim 10, further comprising:

estimating, from the third density, a representation of the density of vehicles on the road, wherein the output specifies the representation of the density of vehicles on the road.

12. The method of claim 10, further comprising:

determining a velocity for each WCD in the second set;

determining a velocity for each WCD in the fifth set; and estimating, from the determined velocity of each WCD in the second set and the fifth set, a representation of aggregate velocity of vehicles on the road, wherein the output is further based on the aggregate velocity of vehicles on the road.

13. The method of claim 10, wherein the first wireless coverage area overlaps with the second wireless coverage area.

14. A traffic server for determining a density of wireless communication devices (WCDs) on a road, wherein the road intersects a plurality of wireless coverage areas, and wherein the plurality of wireless coverage areas serve a first set of WCDs, the traffic server comprising:

a processor;

a memory;

program logic stored in the memory and executable by the processor to receive a request to determine traffic characteristics of the road;

program logic stored in the memory and executable by the processor to query registration data related to each WCD in the first set, wherein the querying determines, as a second set of WCDs, WCDs of the first set that have registered with any of the plurality of wireless coverage areas within a threshold time period;

program logic stored in the memory and executable by the processor to determine a respective geographic location for each WCD in the second set;

program logic stored in the memory and executable by the processor to compare the determined geographic location of each WCD in the second set to a predefined geographic definition of the road;

program logic stored in the memory and executable by the processor to establish a third set of WCDs by selecting from the second set each WCD whose determined geographic location is within the predefined geographic definition of the road;

program logic stored in the memory and executable by the processor to evaluate the geographic locations of the WCDs in the third set to determine a density of WCDs within the predefined geographic definition of the road, wherein evaluating the geographic locations of the WCDs in the third set to determine the density of WCDs within the predefined geographic definition of the road comprises dividing a number of WCDs in the third set by a predetermined average number of WCDs per vehicle; and program logic stored in the memory and executable by the processor to provide an output based on the determined density of WCDs on the road.

15. The traffic server of claim 14, further comprising:

program logic stored in the memory and executable by the processor to calculate the traffic density of vehicles on the road based on the density of WCDs, wherein the output specifies the traffic density of vehicles on the road.

16. The traffic server of claim 14, further comprising:

program logic stored in the memory and executable by the processor to determine a velocity for each WCD in the second set; and program logic stored in the memory and executable by the processor to calculate, from the determined velocity of each WCD in the third set, a representation of aggregate velocity of WCDs on the road, wherein the output is also based on the representation of aggregate velocity of WCDs on the road.

17. The traffic server of claim 16, further comprising:

program logic stored in the memory and executable by the processor to calculate, from the determined velocity of each WCD in the third set, a representation of aggregate velocity of vehicles on the road, wherein the output specifies the representation of aggregate velocity of vehicles on the road.

18. The traffic server of claim 16, wherein program logic stored in the memory and executable by the processor to determine a respective geographic location for each WCD in the second set comprises program logic stored in the memory and executable by the processor to determine global positioning system (GPS) coordinates of at least some WCDs in the second set.

* * * * *